United States Patent [19]

Fialla

[11] Patent Number: 4,618,699
[45] Date of Patent: Oct. 21, 1986

[54] PHTHALIC ACID LOW MOLECULAR WEIGHT POLYESTERS AND PROCESS FOR PREPARING THE SAME

[75] Inventor: Peter Fialla, Wiener Neudorf, Austria

[73] Assignee: Isovolta Oesterreichische Isolierstoffwerke AG, Wiener Neudorf, Austria

[21] Appl. No.: 616,406

[22] Filed: Jun. 1, 1984

[30] Foreign Application Priority Data

Jun. 3, 1983 [AT] Austria .................................. 2031/83

[51] Int. Cl.$^4$ ...................... C07C 67/14; C07C 69/80; C07C 69/82
[52] U.S. Cl. ..................................... 560/86; 528/274; 528/305; 560/98
[58] Field of Search ..................... 560/86, 98; 528/274, 528/305

[56] References Cited

U.S. PATENT DOCUMENTS

| | | | |
|---|---|---|---|
| 2,079,487 | 5/1937 | Carswell .................................. | 560/86 |
| 3,345,400 | 10/1967 | Anagnostopoulos et al. ........ | 560/86 |
| 4,107,137 | 8/1978 | Proux et al. ......................... | 560/86 X |
| 4,312,975 | 1/1982 | Salee et al. .......................... | 560/86 X |

*Primary Examiner*—Natalie Trousof
*Assistant Examiner*—Vera C. Clarke
*Attorney, Agent, or Firm*—Bierman, Peroff & Muserlian

[57] ABSTRACT

Novel low-molecular weight polyesters consisting essentially of chain members of the formula

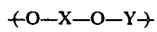

I wherein X is at least one member selected from the group consisting of

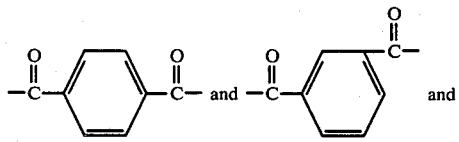

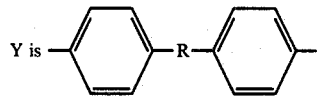

and R is a bifunctional aliphatic hydrocarbon or a bifunctional hydrocarbon containing at least one aromatic or cycloaliphatic ring having an inherent viscosity of 0.08 to 0.35 dl/g measured at 30° C. on a 100 ml solution of 0.5 g of polyester in a solvent of 60% by weight of phenol and 40% by weight of 1,1,2,2-tetrachloroethane useful for further polymerization with amines, amides, imides and a novel method of preparing the same.

14 Claims, 1 Drawing Figure

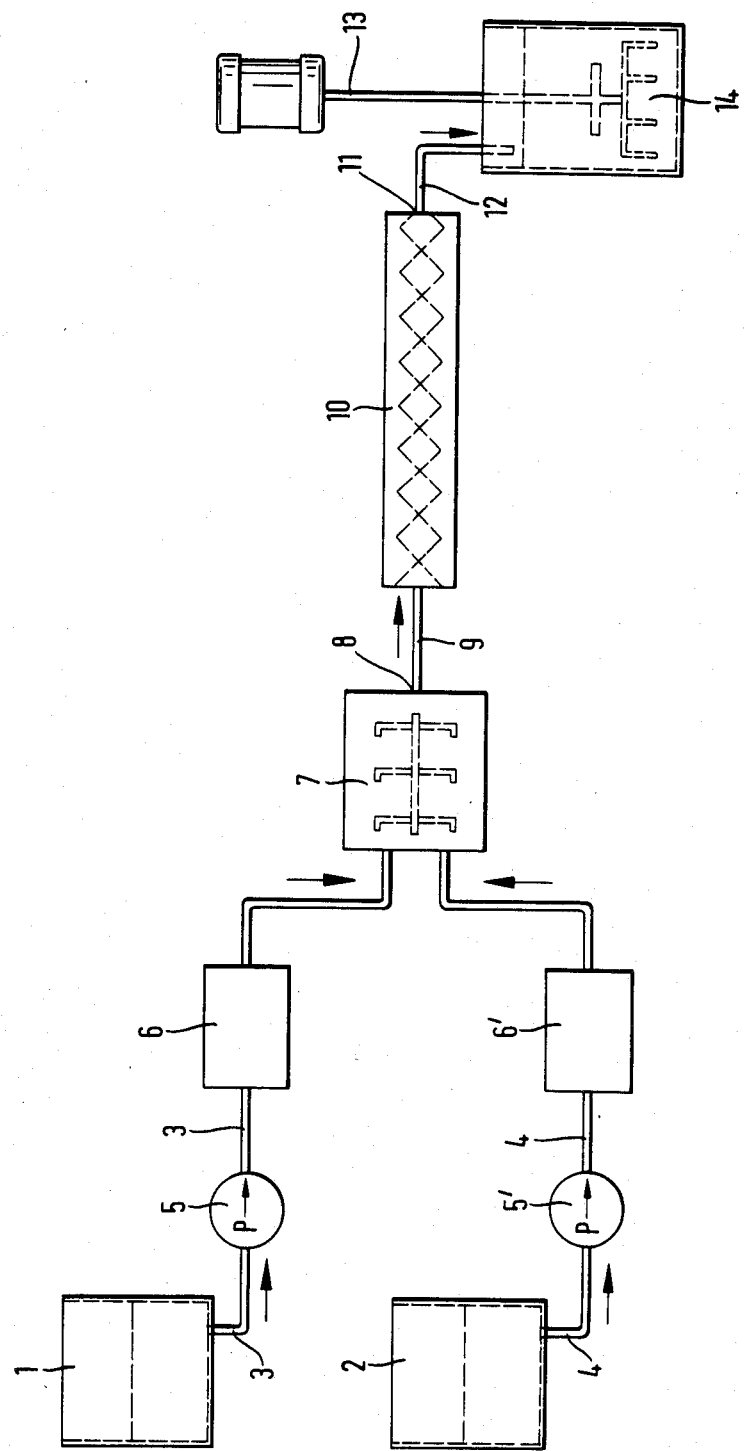

PHTHALIC ACID LOW MOLECULAR WEIGHT POLYESTERS AND PROCESS FOR PREPARING THE SAME

STATE OF THE ART

European patent application publication No. 0041496A1 describes high-molecular weight polyesters of formula I with inherent viscosity values above 1.5 dl/g which are prepared by a interfacial process with a fine dispersion of an aqueous phase of the desired diphenol, a stochiometric amount or slight excess of alkali metal hydroxide and a phase transfer catalyst such as benzyl triethylammonium chloride or tetrabutylammonium chloride or crown ether dissolved in water or a mixture of water and an organic solvent as solubilizer and an organic phase of a solution of the carboxylic acid halide in an organic solvent resulting in the diphenolate transferring to the organic phase with the aid of the phase transfer catalyst for polycondensation with carboxylic acid halide to produce the high-molecular weight polyester in the organic phase.

OBJECTS OF THE INVENTION

It is an object of the invention to produce the low-molecular weight polyesters of formula I with an inherent viscosity of 0.08 to 0.35 dl/g.

It is another object of the invention to provide a reproducible two phase interface process for the preparation of the low molecular weight polyesters of formula I.

These and other objects and advantages of the invention will become obvious from the following detailed description.

THE DRAWING

The drawing is a schematic flow sheet of an apparatus for the process of the invention.

THE INVENTION

The polyesters of the invention are low-molecular weight polyesters consisting essentially of chains of the formula

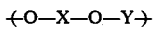

wherein X is at least one member selected from the group consisting of

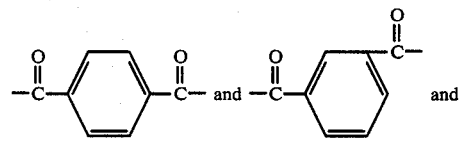

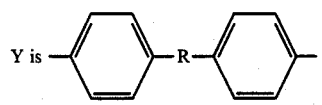

and R is a bifunctional aliphatic hydrocarbon or bifunctional hydrocarbon containing at least one aromatic or cycloaliphatic ring having an inherent viscosity of 0.08 to 0.35 dl/g measured at 30° C. on a 100 ml solution of 0.5 g of polyester in a solvent of 60% by weight of phenol and 40% by weight of 1,1,2,2-tetrachloroethane. Preferably, the inherent viscosity is 0.1 to 0.25 dl/g.

In a preferred embodiment of the invention Y is

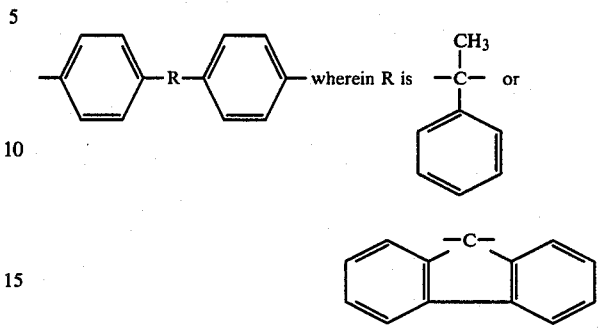

and more preferably X is a mixture of 30 to 70% by weight of

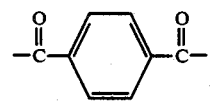

and 70 to 30% by weight of

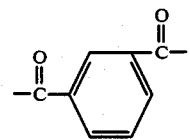

The low-molecular weight polyesters of the invention are useful as components of a polymer mix or as a starting material for further polymerization processes requiring low molecular weight polymers, especially with inherent viscosities of 0.1 to 0.5 dl/g. In such polymerizations, the low molecular weight polyesters of the invention are polycondensed with amines, amides, imides and the like or polyadded to epoxides, norbornenes, etc.

The novel process of the invention for the preparation of the low molecular weight polyesters of the invention in a reproducible manner comprises forming a fine dispersion of an aqueous phase of the desired alkali metal diphenolate and a phase transfer catalyst in water in the optional presence of an organic solvent as solubilizer in an organic phase containing the dicarboxylic acid halide while maintaining an excess of the dicarboxylic acid halide from the beginning for the greatest part of the reaction. This permits one to control the inherent viscosity of the low molecular weight polyester in a reproducible manner.

Preferably, a phase transfer catalyst is present in both the organic and aqueous phases. It is also preferred to add the aqueous phase containing the alkali metal diphenolate to the organic phase containing the carboxylic acid halide, preferably chloride, continuously or in successive portions with constant intense agitation and if necessary, the agitation is continued after the addition is completed for a post reaction period. The aqueous phase should be added slowly enough so that the aqueous phase is immediately finely dispersed into the organic phase.

In a preferred variation of the process, the organic phase and the aqueous phase with a deficiency of the alkali metal diphenolate are continuously mixed by passing successively through at least one dispersing device and/or static mixer. The organic liquid phase may be fed to a tube reactor which is successively provided with one or more dispersing devices and/or static mixers with the aqueous phase being continuously added to the reactor at various addition stations along the flow direction.

Referring now to the FIGURE.

The FIGURE is a schematic flow sheet of an apparatus for the process of the invention.

In the FIGURE, tank 1 contains the aqueous phase and tank 2 contains the organic liquid phase and the liquids flow through lines 3 and 4 respectively to the inlet of dispersing means 7. Dosing pumps 5 and 5' and flow meters 6 and 6' are provided to control the flow of the liquids. Outlet 8 is connected by line 9 to the inlet of static mixer 10 provided with outlet 11 which is connected by line 12 to tank 14 provided with stirrer 13.

The inherent viscosity of the polyesters can be varied by varying the temperature, rate of addition of the aqueous phase, the concentration of the solubilizer and/or the phase transfer catalyst and by the use of a second phase transfer catalyst in the organic phase.

In the following examples there are described several preferred embodiments to illustrate the invention. However, it should be understood that the invention is not intended to be limited to the specific embodiments. The inherent viscosity $IV = n_{inh}$ was measured on 100 ml of a solution of 0.5 g of polyester in a solvent of 60% by weight of phenol and 40% by weight of 1,1,2,2-tetrachloroethane at 30° C.

EXAMPLE 1

8.8 g (0.22 moles) of sodium hydroxide and then 29 g (0.1 mole) of 1,1-bis-(4-hydroxyphenyl)-1-phenyl-ethane were dissolved in 400 ml of heated water and after cooling to room temperature, 70 ml of isopropanol were added thereto. Then, a solution of 1.14 g (0.005 moles) of benzyl-triethylammonium chloride in a minimum of water as a phase transfer catalyst were added thereto to form the aqueous phase.

An organic phase was prepared by dissolving 13.2 g (0.065 mole) of isophthalolyl chloride and 13.2 g (0.065 mole) terephthaolyl chloride under nitrogen in 250 ml of anhydrous dichloroethane in a 2.5 liter flask provided with a high speed stirrer cooled to 17° C. in a cooling bath. The stirrer was turned on and the aqueous phase was added to the flask over six minutes whereby the aqueous phase was immediately dispersed in the organic phase because of the intense stirring and the temperature rose during the addition from 17° C. to about 26° C. After the addition was complete, the mixture was stirred for another six minutes as a post reaction period and the stirring was then stopped. The aqueous and organic phases separated and the aqueous weakly alkaline phase was discarded.

The organic phase containing the low molecular weight polyester was washed 3 times with water and isopropanol was added thereto with stirring to induce precipitation of fine grained polyester. The mixture was vacuum filtered and the product was dried in vacuum at 80° C. to obtain 40 g (95% yield) of the desired polyester with a inherent viscosity of 0.13 dl/g and a melting range of 200° to 220° C.

EXAMPLE 2

The process of Example 1 was repeated using 35 g (0.1 mole) of 9,9-bis-(4-hydroxyphenyl)-fluorene as the diphenol and 140 ml of isopropanol as a solubilizer due to the poor solubility of the said diphenol to obtain 47 g (97.7% yield) of the desired low-molecular weight polyester with an inherent viscosity of 0.15 dl/g and a melting range of 200° to 220° C.

EXAMPLE 3

The process of Example 2 was repeated using 23 g (0.1 mole) of 2,2-bis-(4-hydroxy-phenyl)-propane as the diphenol to obtain 35 g (94.7% yield) of low molecular weight polyester with an inherent viscosity of 0.14 dl/g and a melting range of 140° to 160° C.

EXAMPLE 4

An aqueous phase A was prepared as in Example 1 containing 232.4 g (0.8 moles) of 1,1-bis-(4-hydroxyphenyl)-1-phenyl-ethane, 70.4 g (1.75 moles) of sodium hydroxide, 9.60 liters of water, 1.06 liters of isopropanol and 4.8 g (0.02 moles) of benzyl triethylammonium chloride and an organic phase B was prepared consisting of 162.4 g (0.8 moles) of a 1-1 mixture of isophtholoyl chloride and terephthaloyl chloride, 4.4 liters of dichloroethane and 16.2 g (0.08 moles) of additional mixture of the said acid chlorides to provide a 10% mole excess of acid chloride.

Using the equipment of the above described FIGURE, Phases A and D were placed in tanks 1 and 2, respectively, at 17° C. and using the dosing pumps 5 and 5', aqueous solution A was added to the dispersing means 7 at a rate of 0.344 liter per minute while organic solution B was added thereto at the same time at a rate of 0.265 liters per minute with stirring. The two phases formed a fine dispersion with the temperature increasing to 26° C. and the dispersion was passed through static mixer 10 where the dispersion was maintained to effect polycondensation and was then passed to tank 14 with vigorously stirring.

After the solutions A and B had been completely added to tank 14, the two phases were allowed to separate and the weakly alkaline aqueous phase was discarded. Precipitation and recovery steps of Example 1 were followed to obtain the low molecular weight polyester with an inherent viscosity of 0.18 dl/g and a melting range of 210° to 255° C.

In a variation of the example, the excess of acid chloride was varied by changing the relative flow rates of solutions A and B and it was ascertained that the inherent viscosity decreased with increasing acid chloride excess and vice versa. It was also ascertained that in the inherent viscosity range below about 0.6 to 0.7 dl/g, the range of the melting temperature of the polyester increased substantially linearly with increasing inherent viscosity values. Therefore, the optimum melting temperature of the low-molecular polyester for a particular use can be obtained by adjusting the inherent viscosity.

Various modifications of the low molecular weight polyesters and the process may be made without departing from the spirit or scope of the invention and it is to be understood that the invention is intended to be limited only as defined in the appended claims.

What is claimed is:

1. A low molecular weight polyester consisting essentially of chain members of the formula

wherein X is at least one member of the group consisting of

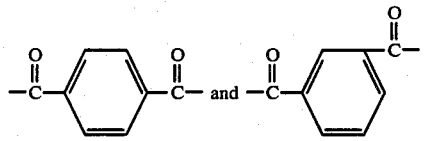

Y is

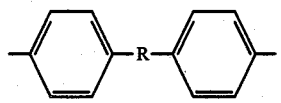

and R is selected from the group consisting of a bifunctional aliphatic hydrocarbon optionally containing at least one cycloaliphatic ring and a bifunctional hydrocarbon containing at least one aromatic ring, said polyester having an inherent viscosity of 0.08 to 0.35 dl/g measured at 30° C. on a 100 ml solution of 0.5 g of polyester in a solvent of 60% by weight of phenol and 40% by weight of 1,1,2,2-tetrachloroethane.

2. A polyester of claim 1 wherein X is a mixture of 30 to 70% by weight of

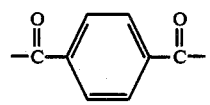

and 70 to 30% by weight of

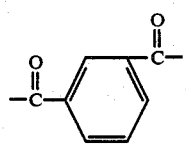

3. A polyester of claim 1 wherein R is

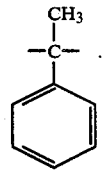

4. A polyester of claim 1 wherein R is

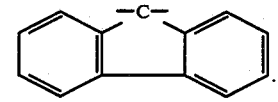

5. A polyester of claim 2 wherein R is

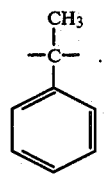

6. A polyester of claim 2 wherein R is

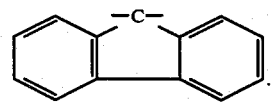

7. A polyester of claim 1 wherein the inherent viscosity is 0.1 to 0.25 dl/g.

8. A process for the preparation of a polyester of claim 1 comprising forming a fine dispersion of an aqueous phase of the desired alkali metal diphenolate and a phase transfer catalyst in water in the optional presence of an organic solvent as solubilizer in an organic phase containing the dicarboxylic acid halide while maintaining an excess of the dicarboxylic acid halide from the beginning for the greatest part of the reaction.

9. The process of claim 8 wherein the organic phase also contains a phase transfer catalyst.

10. The process of claim 8 wherein the aqueous phase is added continuously or successively batchwise to the intensely stirred organic phase and continuing the stirring after completion of the addition for a post reaction period.

11. The process of claim 10 wherein the aqueous phase is added slowly to ensure immediate dispersion in the organic phase.

12. The process of claim 10 wherein the addition is over 1 to 15 minutes.

13. The process of claim 8 wherein the dispersion of the aqueous phase with a deficiency of the alkali metal diphenolate in the organic phase is successively passed through at least two members of the group consisting of dispersion means and static mixers.

14. The process of claim 8 wherein the organic phase is passed successively through a series of members selected from the group consisting of dispersions means and static mixers while continuously adding the aqueous phase at a plurality of successive points.

* * * * *